United States Patent Office 3,119,737
Patented Jan. 28, 1964

3,119,737
COMPOSITIONS AND METHODS FOR CONTROLLING SOIL-DWELLING FUNGI
Paul D. Strickler, Shawnee Mission, and Joe W. Pullen, Overland Park, Kans., assignors to Spencer Chemical Company, Kansas City, Mo., a corporation of Missouri
No Drawing. Filed May 17, 1961, Ser. No. 110,655
12 Claims. (Cl. 167—30)

This invention relates to methods for controlling soil-dwelling fungi, and more particularly, this invention relates to fungicidal compositions and methods of impregnating soil with a 4-halo-2-butynyl phenyl ether to control soil-dwell fungi.

Losses due to soil-dwelling fungi run to millions of dollars each year. The fungi attack the seed, causing them to rot before germination, thus resulting in little or no emergence of the young plant from the soil. This is known as seed decay. The fungi can also attack the stems of seedlings at ground level causing them to rot and fall over, an effect known as post-emergence damping off. One method for combatting these losses is over-planting, resulting in a great amount of waste. Obviously, there is a need for alternate methods for controlling soil-dwelling fungi.

There are provided by this invention methods for controlling soil-dwelling fungi which result in increased germination of the seed, improving the emergence as well as the crop harvest. There are also provided by this invention novel fungicidal compositions for treating soil as well as soil treated with said compositions. Other beneficial results flowing from the disclosure of this invention will become apparent from the following specification and claims.

The method of this invention comprises impregnating soil with a 4-halo-2-butynyl phenyl ether of the formula:

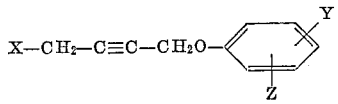

wherein X represents a halogen atom, Y represents a radical selected from the group consisting of hydrogen, chloro and methyl, and Z represents a hydrogen or chlorine atom. By application of a fungicidal amount of a 4-halo-2-butynyl phenyl ether of this invention to soil so as to impregnate the soil with the active compound, soil-dwelling fungi are effectively controlled, thereby improving germination and emergence of seedlings as well as the growth vigor of the young plants. Due to the volatility of the active 4-halo-2-butynyl phenyl ethers of this invention, the compounds will permeate the soil for a short distance from the point of application, depending, of course, on the temperature, moisture content, compactness and physical consistency of the soil, thereby controlling soil-dwelling fungi in adjacent areas.

Representative soil fungicides of this invention include the compounds 4-chloro-2-butynyl phenyl ether, 4-chloro-2-butynyl 3-chlorophenyl ether, 4-bromo-2-butynyl phenyl ether, 4-iodo-2-butynyl phenyl ether, 4-chloro-2-butynyl 3-methylphenyl ether, 4-bromo-2-butynyl 4-chlorophenyl ether, 4-chloro-2-butynyl 2,4-dichlorophenyl ether and 4-chloro-2-butynyl 2-chloro-6-methylphenyl ether. The presently preferred compounds are 4-bromo-2-butynyl phenyl ether and 4-chloro-2-butynyl phenyl ether.

The 4-halo-2-butynyl phenyl ethers of this invention are readily prepared by the reaction of the corresponding 1,4-dihalo-2-butyne with a suitable phenol in the presence of an alkali metal hydroxide such as sodium hydroxide. The reaction is conveniently run in the presence of a solvent such as water at an elevated temperature such as reflux temperature. Of course, somewhat higher and lower temperatures can be used with good results, as would be obvious to those skilled in the art. The reaction time is not narrowly critical, and may vary from about 3 to 10 hours depending on the reaction medium and temperature employed. The oily products are separated by decantation, in the case of an aqueous solvent, and purified by distillation under reduced pressure.

The following examples illustrate the preparation of representative compounds of this invention.

EXAMPLE 1

4-Chloro-2-Butynyl Phenyl Ether

To a mixture of 467 grams (3.8 moles) of 1,4-dichloro-2-butyne, 348 grams (3.7 moles) of phenol and 1250 milliliters of water was added, with good agitation, 144 grams (3.6 moles) of sodium hydroxide in 350 ml. of water over a one-hour period at reflux temperature. Agitation and reflux were continued for an additional 6 hours; the aqueous layer was then decanted and the oily layer dried over anhydrous sodium sulfate. After removal of the drying agent by filtration, the residual oil was distilled under reduced pressure to yield approximately 468 grams (70% of theory) of a colorless liquid, boiling at 130–132° C./7 mm. Hg; $N_D^{20}$ 1.5570. Analysis.—Calculated for $C_{10}H_9ClO$: C, 66.6; H, 5.0  Found: C, 66.5; H, 5.1.

In the following examples, the compounds were prepared according to the general procedure of Example 1.

EXAMPLE 2

4-Chloro-2-Butynyl 3-Methylphenyl Ether 4-chloro-2-butynyl 3-methylphenyl ether was prepared in a similar manner by the reaction of 1,4-dichloro-2-butyne with 3-methylphenol in the presence of sodium hydroxide. The compound boils at 129–133° C./4 mm. Hg.

EXAMPLE 3

4-Bromo-2-Butynyl Phenyl Ether 4-bromo-2-butynyl phenyl ether is prepared in a similar manner by the reaction of 1,4-dibromo-2-butyne with phenol in the presence of sodium hydroxide. The compound boils at 124–127° C./3.5 mm. Hg.

EXAMPLE 4

4-Chloro-2-Butynyl 3-Chlorophenyl Ether 4-chloro-2-butynyl 3-chlorophenyl ether was prepared in a similar manner by the reaction of 1,4-dichloro-2-butyne with 3-chlorophenol in the presence of sodium hydroxide. The compound boils at 153° C./5 mm. Hg.

EXAMPLE 5

4-Chloro-2-Butynyl 2,4-Dichlorophenyl Ether 4-chloro-2-butynyl 2,4-dichlorophenyl ether was prepared in a similar manner by the reaction of 1.4-dichloro-2-butyne with 2,4-dichlorophenol in the presence of sodium hydroxide. The compound boils at 150–153° C./3 mm. Hg.

EXAMPLE 6

4-Chloro-2-Butynyl 2-Chloro-6-Methylphenyl Ether 4-chloro-2-butynyl 2-chloro-6-methylphenyl ether was prepared in a similar manner by the reaction of 1,4-dichloro-2-butyne with 2-chloro-6-methylphenol in the presence of sodium hydroxide. The compound boils at 137–140° C./3 mm. Hg.

The 4-iodo-2-butynyl phenyl ethers can be prepared by conventional metathesis, such as the reaction of sodium iodide with the corresponding 4-bromo-2-butynyl phenyl ether or 4-chloro-2-butynyl phenyl ether.

In order to control soil-dwelling fungi according to the method of this invention, the fungicidal compositions are applied to soil in such a manner as to impregnate the soil with the active 4-halo-2-butynyl phenyl ether. This may be accomplished by soil drench after the crop seed has been planted wherein the active compound is applied to the surface of soil such as by spraying and then moved several inches below the surface of the soil by naturally occurring precipitation or artificial means such as by watering. The active compositions may also be applied by application to the seed furrow as the seed is planted or by thoroughly mixing with the soil prior to planting the seed. Other methods for applying the compositions to soil so as to impregnate the soil with the fungicidal ether, such as by adding to irrigation water, etc., will be obvious to those skilled in the art.

Suitable rates of application to soil to control soil-dwelling fungi are about 2 to about 200 pounds of one or more of the active 4-halo-2-butynyl phenyl ethers per acre. Preferably an application rate of about 3 to about 40 pounds per acre is used.

Since a relatively small amount of fungicidal 4-halo-2-butynyl phenyl ether is required for distribution in soil, the ether preferably is formulated as an emulsifiable concentrate or a wettable powder which can be diluted with water for application to soil. Other useful compositions for treating soil, especially as the seed is planted, comprise the active 4-halo-2-butynyl phenyl ether adsorbed on a solid, inert carrier such as talc, clay, diatomaceous earth, sawdust, calcium carbonate, and the like. Of course, under certain conditions, it may be desirable to dissolve the ether in an inert solvent for dispersion in soil.

There are thus also provided by this invention novel fungicidal compositions containing one or more of the described active ethers intimately dispersed in an inert diluent or adsorbed on an inert carrier for the intended use. Such inert diluents or carriers may be solids as described above or liquids such as water, kerosene, acetone, benzene, toluene, xylene and the like in which the active ether may either be dissolved or dispersed. Emulsifying agents are advisably used to achieve a suitable emulsion if two immiscible liquids are used as a carrier. Wetting agents may also be used, such as with wettable powder formulations, to aid in dispersing the active soil fungicide in liquids used as a carrier in which the fungicide is not completely soluble. Emulsifying agents and wetting agents, also known as "surface active agents," are sold under numerous trademarks and may be either pure compounds, mixtures of compounds of the same general group, or they may be mixtures of compounds of different classes. Typical satisfactory surface active agents which may be used are alkali metal higher alkylarylsulfonates such as sodium dodecylbenzenesulfonate and the sodium salts of alkylnaphthalenesulfonic acids, fatty alcohol sulfates such as the sodium salts of monoesters of sulfuric acid with n-aliphatic alcohols containing about 8 to 18 carbon atoms, long chain quaternary ammonium compounds, sodium salts of petroleum derived alkylsulfonic acids, polyethylene sorbitan monooleate, alkylarylpolyether alcohols, water-soluble lignin sulfonate salts, alkali-casein compositions, long chain alcohols usually containing about 10 to 18 carbon atoms, and condensation products of ethylene oxide with fatty acids, alkylphenols and mercaptans. A suitable application rate of a diluted emulsifiable concentrate is about 500 gallons per acre.

In the following example, several representative 4-halo-2-butynyl phenyl ethers of this invention were tested as fungicides for controlling the soil-dwelling fungi, Pythium sp. 4-chloro-2-butenyl phenyl ether was also tested for comparison with the 4-halo-2-butynyl phenyl ethers.

EXAMPLE 7

Each chemical was thoroughly mixed with four parts by weight of an attapulgite clay. A sample of this mixture (190 mg.) was added to 750 grams of soil infected with the fungi Pythium sp. and mixed well in a twin-shell blender. This gives an application rate of 100 pounds of active ether per acre. Some compounds were also tested at lower rates of application. About 50 to 70 milliliters (depending upon soil conditions) of water was placed in an 8 oz. squat-shaped paper cup, which was then filled with about 350 grams of the treated soil to within ¾ inch of the top of the cup. Five pea (v. Laxton Progress) seeds were then added and covered with ½ inch of soil. The cup was covered with a 12 oz. waxed paper cup. After 5–7 days the cover was removed and 3–5 days later the compound was rated as to crop stand and chemical injury. Rating is based on a 0–4 basis with 0 being no disease control (no germination) and 4 being excellent disease control. Chemical injury was also rated on a 0–4 basis with 0 being phytotoxic and 4 being no injury. The results are recorded in Table I.

TABLE I

| Compound | Application Rate (lbs./A.) | Disease Control | Chemical Injury |
| --- | --- | --- | --- |
| 4-chloro-2-butynyl-3 methylphenyl ether | 100 | 1 | 4 |
| 4-chloro-2-butynyl 3-chlorophenyl ether | 100 | 3 | 3 |
| 4-chloro-2-butynyl 2,4-dichlorophenyl ether | 100 | 1 | 4 |
| 4-chloro-2-butynyl 2-chloro-6-methylphenyl ether | 100 | 1 | 4 |
| 4-bromo-2-butynyl phenyl ether | 100 | 4 | 0 |
| | 50 | 3 | 4 |
| | 25 | 3 | 4 |
| | 13 | 3 | 4 |
| | 6 | 3 | 4 |
| 4-chloro-2-butynyl phenyl ether | 100 | 3 | 0 |
| | 50 | 3 | 4 |
| | 25 | 3 | 4 |
| | 13 | 1 | 4 |
| 4-chloro-2-butenyl phenyl ether | 100 | 1 | 4 |
| Control (no chemical) | 0 | 0 | 4 |

The following is an example of a representative emulsifiable concentrate:

47.6% (weight) 4-chloro-2-butynyl phenyl ether
49.9% Espesol 6 (a highly refined petroleum base substitute for toluol)
2.5% Atlox 4500 (a blend of anionic and nonionic surface active agents)

This gives a concentrate having a specific gravity at 25° C. of 1.006 and containing 4 pounds of the active compound per gallon. When diluted with water, this gives a suitable emulsion for application to soil by spraying, drenching or application by adding to irrigation ditches.

Various obvious changes and modifications of the invention can be made, and to the extent that such variations incorporate the spirit of this invention they are intended to be included within the scope of the appended claims.

What is claimed is:

1. The method for controlling soil-dwelling fungi which comprises impregnating soil with a fungicidal amount of a 4-halo-2-butynyl phenyl ether of the formula

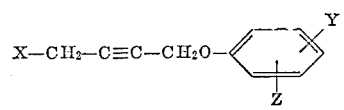

wherein X represents a halogen atom, Y represents a radical selected from the group consisting of hydrogen, chloro and methyl, and Z represents an atom selected from the group consisting of hydrogen and chlorine.

2. The method of claim 1 in which said 4-halo-2-butynyl phenyl ether is 4-chloro-2-butynyl phenyl ether.

3. The method of claim 1 in which said 4-halo-2-butynyl phenyl ether is 4-bromo-2-butynyl phenyl ether.

4. The method of claim 1 in which said 4-halo-2- butynyl phenyl ether is 4-chloro-2-butynyl 3-chlorophenyl ether.

5. The method of claim 1 in which said 4-halo-2-butynyl phenyl ether is applied at a rate of about 2 pounds per acre to about 200 pounds per acre.

6. The method of claim 1 in which said 4-halo-2-butynyl phenyl ether is applied at a rate of about 3 pounds per acre to about 40 pounds per acre.

7. A fungicidal composition for controlling soil-dwelling fungi comprising a surface active agent and a 4-halo-2-butynyl phenyl ether of the formula

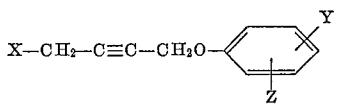

wherein X represents a halogen atom, Y represents a radical selected from the group consisting of hydrogen, chloro and methyl, and Z represents an atom selected from the group consisting of hydrogen and chlorine.

8. A fungicidal composition for controlling soil-dwelling fungi comprising a surface active agent and 4-chloro-2-butynyl phenyl ether.

9. A fungicidal composition for controlling soil-dwelling fungi comprising a surface active agent and 4-bromo-2-butylnyl phenyl ether.

10. A fungicidal composition for controlling soil-dwelling fungi comprising a surface active agent and 4-chloro-2-butynyl 3-chlorophenyl ether.

11. Soil impregnated with a fungicidal amount of a 4-halo-2-butynyl phenyl ether of the formula

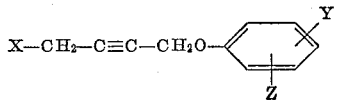

wherein X represents a halogen atom, Y represents a radical selected from the group consisting of hydrogen, chloro and methyl, and Z represents an atom selected from the group consisting of hydrogen and chlorine.

12. Soil impregnated with a fungicidal amount of 4-bromo-2-butynyl phenyl ether.

References Cited in the file of this patent

UNITED STATES PATENTS

| | | |
|---|---|---|
| 2,541,091 | Oroshnik | Feb. 13, 1951 |
| 2,897,241 | Watson | July 28, 1959 |
| 2,937,205 | Robertson | May 17, 1960 |
| 2,992,160 | Lemin et al. | July 11, 1961 |
| 2,997,447 | Russell et al. | Aug. 22, 1961 |

OTHER REFERENCES

Chem. Abst., vol. 34: 6589⁸, vol. 46: 3976a.